US 6,712,464 B1

(12) United States Patent
Minami et al.

(10) Patent No.: US 6,712,464 B1
(45) Date of Patent: Mar. 30, 2004

(54) IMAGE PROCESSING APPARATUS, IMAGE PROCESSING SYSTEM APPARATUS, AND RECORDING MEDIUM WHICH RECORDS IMAGE PROCESSING PROGRAM

(75) Inventors: Yuji Minami, Chichibu (JP); Minoru Sashida, Chichibu (JP)

(73) Assignee: Canon Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/546,317

(22) Filed: Apr. 7, 2000

(30) Foreign Application Priority Data

Apr. 9, 1999 (JP) .......................................... 11-102400

(51) Int. Cl.[7] ................................ B41J 2/01; G03B 1/00
(52) U.S. Cl. ........................................ 347/107; 396/310
(58) Field of Search ............................ 347/3, 101, 104, 347/107; 396/310

(56) References Cited

U.S. PATENT DOCUMENTS

| 5,260,805 A | * | 11/1993 | Barrett ..................... 358/449 |
| 5,615,877 A | * | 4/1997 | Watanabe et al. ........... 271/259 |
| 5,793,499 A | * | 8/1998 | Hollis et al. ................ 358/439 |
| 5,870,114 A | * | 2/1999 | Numata et al. ............... 347/16 |
| 5,965,862 A | * | 10/1999 | Momose ..................... 235/449 |
| 6,369,811 B1 | * | 4/2002 | Graham et al. ............. 345/349 |

FOREIGN PATENT DOCUMENTS

WO  WO-9906217 A  *  2/1999  ............ B41J/13/26

* cited by examiner

*Primary Examiner*—Russell Adams
*Assistant Examiner*—Alfred E. Dudding
(74) *Attorney, Agent, or Firm*—Fitzpatrick, Cella, Harper & Scinto

(57) ABSTRACT

An image processing apparatus which feeds a placed original, reads image information on the original by a reading unit, and forms an image on the original by an ink-jet printing head arranged on a downstream side along the original feed direction has an add-on processing part for changing the image information read by the reading unit in correspondence with the image to be formed by the ink-jet printing head.

13 Claims, 7 Drawing Sheets

IMAGE PROCESSING APPARATUS, IMAGE PROCESSING SYSTEM APPARATUS, AND RECORDING MEDIUM WHICH RECORDS IMAGE PROCESSING PROGRAM

BACKGROUND OF THE INVENTION

1. Field of the Invention

The present invention relates to an image processing apparatus such as a scanner, an image processing system apparatus used in connection to an information processing apparatus, and a recording medium which records an image processing program that can be suitably applied to this image processing apparatus.

2. Related Background Art

Conventionally, a so-called scanner (image processing apparatus) for reading an image is generally used as an image processing system apparatus connected to an information processing apparatus (personal computer; to be referred to as a PC hereinafter) for processing information through an interface part or used as a standalone scanner. A user obtains an image by scanning an original and stores the image in a recording medium such as an HDD, CDR, or MOD provided on the PC or scanner side as an electronic file.

The user occasionally searches for image data stored in the recording medium on the basis of a scanned original, or conversely, searches for a scanned original on the basis of image data on the recording medium.

To simplify this search operation, a technique called imprinter is conventionally used in which a printing head is arranged before a reading sensor in the original feed path of a scanner (on the upstream side of the original feed direction).

More specifically, a technique is employed in which a predetermined image is formed on a fed original by the printing head arranged before the reading sensor, the original that has undergone the image formation processing is read by the reading sensor, and the read image is stored in a recording medium provided in the PC or scanner. As a predetermined image formed on the fed original, for example, the document name, serial number, and date are printed on the margin of an original to be read as additive information. The stored original can be easily rearranged or searched for by reading the printed original.

However, in the above-described technique, the printing head is arranged before the reading sensor to print the information before image reading. If ink is not sufficiently dried, the front surface of the reading sensor is contaminated to adversely affect image reading. Additionally, high-speed operation is inhibited because drying ink takes time.

Furthermore, when an original feed error such as overlap feeding or jam occurs before the reading sensor, and the original is re-read by an error restoration operation, double printing may be performed because the original has already been printed. Especially in case of overlap feeding, data different from original data to be printed may be undesirably printed.

The present invention has been made in consideration of the above situation, and has as its object to provide an image processing apparatus, image processing system apparatus, and recording medium which records an image processing program, which can prevent ink contamination, increase the operation speed, and perform appropriate image formation processing even in case of a sheet material feed error.

SUMMARY OF THE INVENTION

In order to achieve the above object, the present invention has the following characteristic features.

As one of the functions of an image processing apparatus according to the present invention image processing means processes an image read by image reading means on the basis of an image to be formed by image formation means. Since no image need be formed before image reading, ink contamination can be prevented, and the operation speed can be increased.

Since the image reading means is arranged upstream of the image formation means along the sheet material feed direction, the image reading part is not contaminated by ink in image reading.

Since the image processing means is separated into an add-on processing part for performing image processing and a control part for controlling image processing by the add-on processing part, allotment of operation becomes clear, and more accurate image processing can be performed.

In an image processing apparatus for reading an image on a sheet material and storing the read image on the sheet material in storage means, an add-on processing part controlled by a control part changes image information on the basis of an image to be formed by image formation means, and the changed image information is stored in the storage means. Hence, the convenience of the read image information is increased. Additionally, since no image need be formed before image reading, ink contamination can be prevented, and the operation speed can be increased.

First state detection means is disposed at a position upstream the image formation means. The apparatus also comprises warning means for generating warning (for example, sound generation, light emission, image display, a combination thereof, or another warning; this also applies to the rest of this specification). Hence, the state of the sheet material can be detected before image formation. Even when a sheet material feed error such as overlap feeding or jam occurs, appropriate image formation processing can be performed.

Warning is generated when the position of the image to be formed by the image formation means falls out of the range of the length of the sheet material. For this reason, even in an error state wherein the length of the sheet material is smaller than the length of the image to be formed by the image formation means, an appropriate image can be formed.

Warning is generated when the position of the image to be formed by the image formation means falls out of the range of the width of the sheet material. For this reason, even in an error state wherein the width of the sheet material is smaller than the width of the image to be formed by the image formation means, an appropriate image can be formed.

The operation of the image formation means is stopped when the position of the image to be formed by the image formation means falls out of the range of the length of the sheet material. For this reason, the apparatus can appropriately cope with even an error state wherein the length of the sheet material is smaller than the length of the image to be formed by the image formation means. In addition, the operation of the image formation means is stopped when the position of the image to be formed by the image formation means falls out of the range of the width of the sheet material. For this reason, the apparatus can appropriately cope with even an error state wherein the width of the sheet material is smaller than the width of the image to be formed by the image formation means.

As one of the functions of a recording medium which records an image processing program according to the present invention, a program used in an image processing apparatus for reading an image on a sheet material and storing the read image on the sheet material in storage means changes image information on the basis of an image to be formed by image formation means and stores the changed image information in the storage means. Hence, the convenience of the read image information is increased. Additionally, since no image need be formed before image reading, ink contamination can be prevented, and the operation speed can be increased. The recording medium includes a magnetic tape, magnetic disk, optical disk, and semiconductor memory device.

First state detection means for detecting the state of the sheet material is caused to detect the state of the sheet material. On the basis of the detection result, at least one of start of a warning operation by warning means and stop of an image formation operation by the image formation means is performed. Hence, the state of the sheet material can be detected before image formation. Even when a sheet material feed error such as overlap feeding or jam occurs, appropriate image formation processing can be performed.

The functions of the present invention will be described more specifically. The image formation means such as an imprinter is arranged downstream of the image reading means along the sheet material feed direction. The apparatus also has an add-on processing part for processing image data read by the image reading means. The add-on processing part is operated in association with the contents of the image to be printed by the image formation means. With this arrangement, contamination of, e.g., the sensor part can be avoided, and the operation speed can be increased because long time is not required to dry ink.

First or second state detection means is arranged before the image formation means. When a sheet material feed error is detected by the first or second state detection means, warning is generated, or the operation of the image formation means for the sheet material is stopped. For this reason, even when a sheet material feed error occurs, any disadvantage represented by double printing or printing of different data can be prevented.

DETAILED DESCRIPTION OF THE PREFERRED EMBODIMENTS

Embodiments of an image processing apparatus and a recording medium which records an image processing program of the present invention will be described next with reference to the accompanying drawings.

Figure 1:
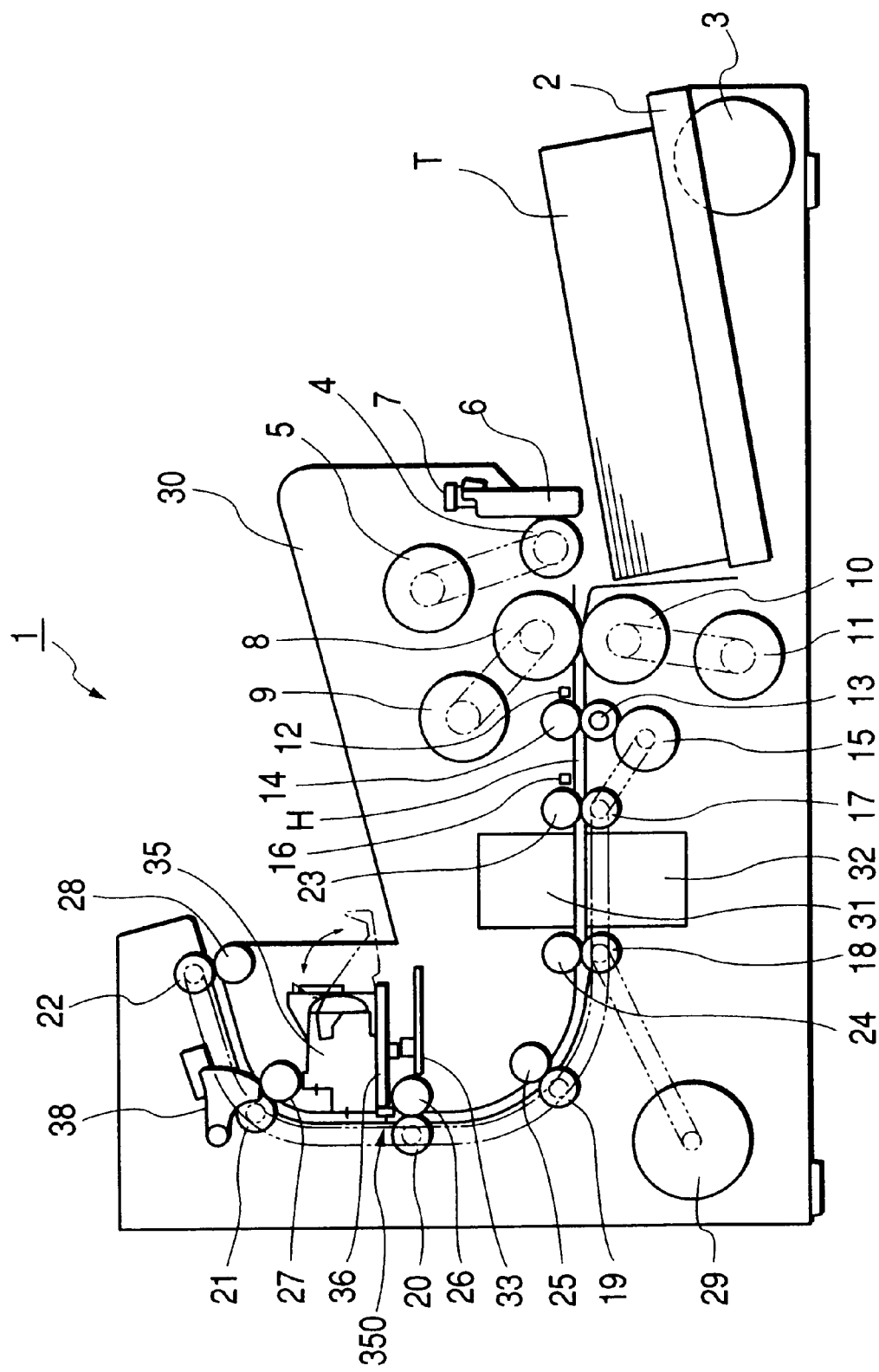
FIG. 1 is a view showing the structure of an image processing apparatus according to an embodiment of the present invention.

FIG. 1 is a view showing a structure in which an image processing apparatus according to an embodiment of the present invention is applied to a sheet-through scanner 1.

Referring to FIG. 1, an original stack T as a sheet material is set on an original table 2. An original table motor 3 vertically moves the original table 2 in accordance with the remaining number of sheets of the original stack T. A pick-up roller 4 feeds an original as the uppermost sheet material of the original stack T to a separation feed part. A pick-up motor 5 rotatably drives the pick-up roller 4.

A pick-up lever 6 detects the upper surface position of the original stack T. A pick-up sensor 7 detects the motion of the pick-up lever 6. The position detected by the pick-up sensor 7 corresponds to the upper surface position of the original stack T fed by the pick-up roller 4. This position is determined with respect to a separation feed mechanism to be described later.

The apparatus has a feed roller 8. A feed roller motor 9 located above the feed roller 8 serves as the driving source of the feed roller 8.

A separation roller 10 rotates reversely with respect to the feed direction. A separation motor 11 functions as the driving source of the separation roller 10. Only one original sheet is reliably separated from the original stack T by the above-described feed roller 8 and separation roller 10 and fed.

The apparatus also includes a pre-registry sensor 12 for detecting passage of the original, registration roller 13, driven roller 14 opposing and pressed against the registration roller 13, a clutch 15 for switching driving of the registration roller 13, and a post-registry sensor 16 for detecting passage of the original.

Feed rollers 17, 18, 19, 20, 21, and 22 rotate at the same rotation speed as that of the registration roller 13. Driven roller 23, 24, 25, 26, 27, and 28 oppose and are pressed against the feed rollers 17, 18, 19, 20, 21, and 22, respectively.

A detachable ink-jet printing head 35 as an image formation means prints designated characters or image on the surface of the fed original. The ink-jet printing head 35 is attached to a printer table 36. The printer table 36 is moved to a plurality of printing positions set on a predetermined position line perpendicular to the original feed direction, so printing can be performed at a desired position in the longitudinal direction of the original.

A printer sensor 33 detects the position and the presence/absence of the ink-jet printing head 35. The printer sensors 33 are arranged in correspondence with the printing positions of the ink-jet printing head 35.

A sheet discharge sensor 38 detects the fed original. Originals discharged from a feed path H are stacked on a discharge part 30. A main motor 29 drives the feed system from the registration roller. Reading units 31 and 32 serve as image reading means which read information on the upper and lower surfaces of the fed original, respectively.

Figure 2:
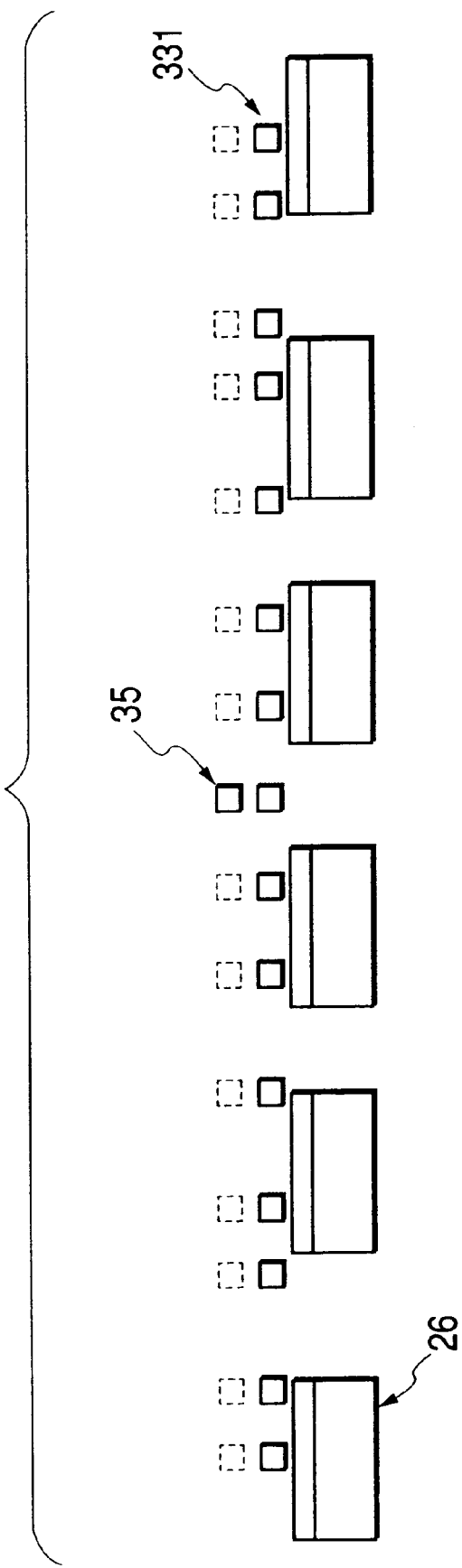
FIG. 2 is an enlarged view of a structure near an image formation part.
Figure 3:
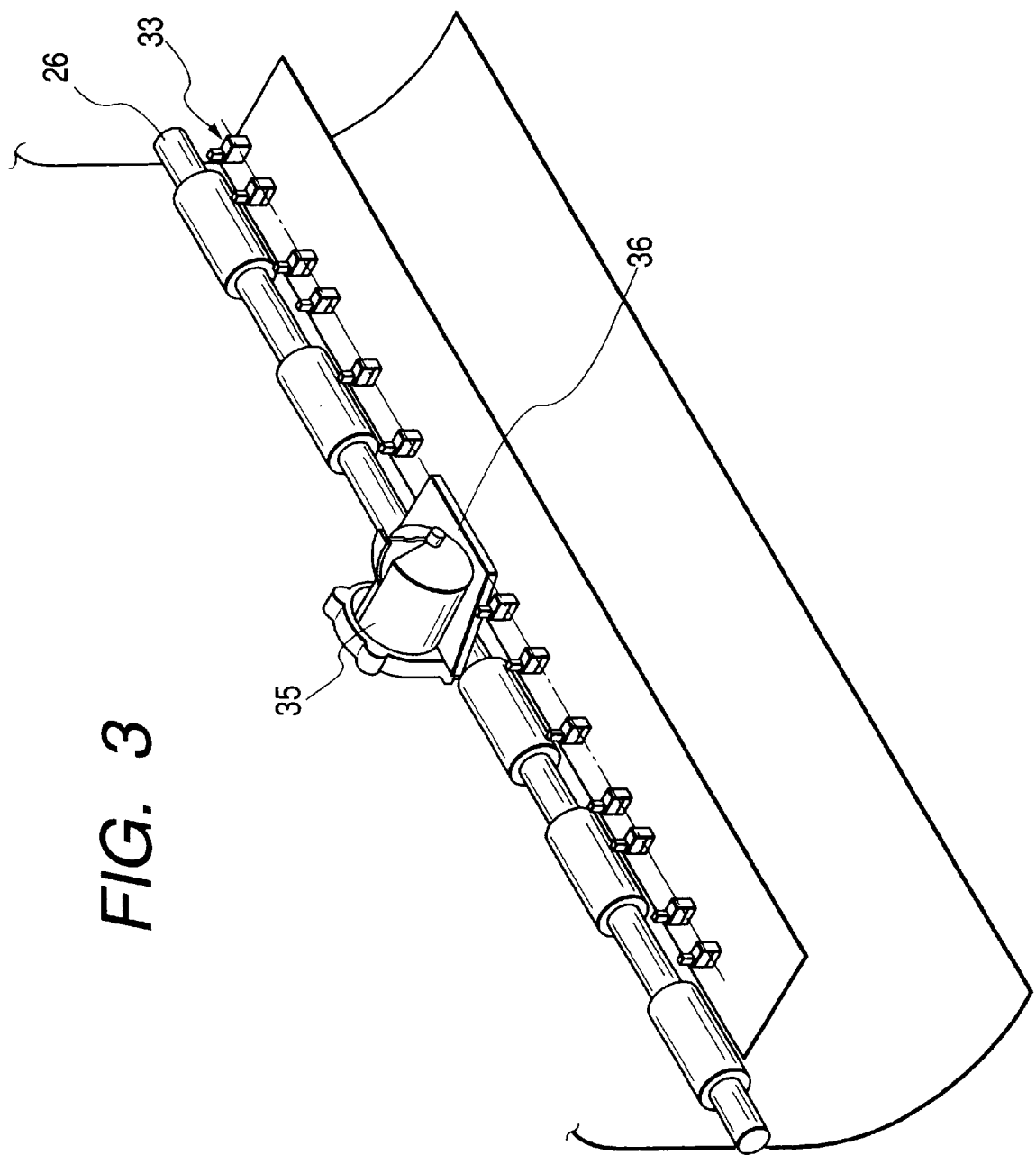
FIG. 3 is a perspective view showing the structure near the image formation part.

A structure near the image formation part shown in FIG. 1 will be described with reference to FIG. 2. FIG. 2 is an enlarged view of a structure near an image formation part when viewed from the longitudinal direction of the image processing apparatus shown in FIG. 1. FIG. 3 is a perspective view showing the structure near the image formation part.

In FIG. 2, the relationship between the ink-jet ports of the ink-jet printing head 35, the driven roller 26, and the original feed part, which are shown in FIG. 1, is viewed from the front surface of the set (right side in FIG. 1). Normally, in order to prevent the driven rollers 27 and 28 from being contaminated by ink, they are set offset from the longitudinal direction in which the printing head is arranged.

Printer sensors 331 correspond to the printer sensors 33 seen through from the front side. In this embodiment, 15 sensors are laid out in the main scanning direction of a paper sheet. The printing head 35 on the printer table 36 can move in the layout direction of the printer sensors 33. In this embodiment, when the printing head moves, one of the 15 positions corresponding to the printer sensors 33 laid out in the longitudinal direction can be selected as a printing position. When the printing head 35 is moved, one of the printer sensors 33 laid out as the printer sensors 331 can detect the head position. A controller 300 determines the output from the printer sensor 33 and inhibits imprinting when the printing head 35 is not present at the position of the printer sensor 33.

The arrangement of the image formation part applied to the image processing apparatus of the present invention is not limited to that shown in FIG. 2. The numbers and shapes of the printing head 35, printer sensors 331, and driven roller 26 near the upstream of the feed path can be arbitrarily changed.

Original reading and the printing operation by the ink-jet printing head will be described next with reference to FIG. 1. The original stack T stacked on the original table 2 is moved upward by the original table motor 3. When the upper surface of the original stack T comes into contact with the pick-up lever 6, and the pick-up sensor 7 detects it, upward movement of the original table is stopped. The pick-up motor 5 is driven to feed an original to the separation feed part.

As for supply of the second and subsequent originals, since the original stack T on the original table 2 has already moved to the determined upper position as described above, the trailing edge of the original that is being fed is detected by the post-registry sensor 16, and then the pick-up roller 4 is driven to feed the second and subsequent originals.

The originals fed to the separation feed part are separated one by one by the above-described separation mechanism and fed to the feed path H.

When a predetermined time has elapsed after the pre-registry sensor 12 detects that the leading edge of the original has passed, the clutch 15 is turned on to transmit the driving force of the main motor 29 to the registration roller 13, so the original is fed to the reading units 31 and 32.

After it is detected that the leading edge of the fed original has passed the pre-registry sensor 12, and a time in which the original is properly fed through the pre-registry sensor 12, registration roller 13, and driven roller 14 has elapsed on the basis of the feed speed, the pick-up roller 4 and feed roller 8 synchronously rotate in accordance with the original feed speed while stopping driving.

When a predetermined time P calculated on the basis of the feed speed and the distance between the post-registry sensor 16 and the reading units has elapsed after the leading edge of the original fed by the above-described registration roller 13 is detected by the post-registry sensor 16, image information on the upper surface is read by the reading unit 31, and image information on the lower surface is read by the reading unit 32.

When a predetermined time Q calculated on the basis of the feed speed, the distance between the post-registry sensor 16 and the printing position of the printing head 35, and a predetermined distance between the original leading edge and the printing position has elapsed after detection by the above-described post-registry sensor 16, a designated character is printed on the upper surface of the fed original.

The operator can move the printer table 36 from one of the 15 printing positions set on the line perpendicular to the feed direction to a desired printing position and attach the ink-jet printing head 35 in advance.

When the above-described predetermined time P has elapsed after it is detected that the trailing edge of the original has passed the post-registry sensor 16, reading is stopped.

When a printing character string having a length more than the length of the original feed direction is designated, printing by the ink-jet printing head 35 is stopped after the above-described predetermined time P.

Figure 4:
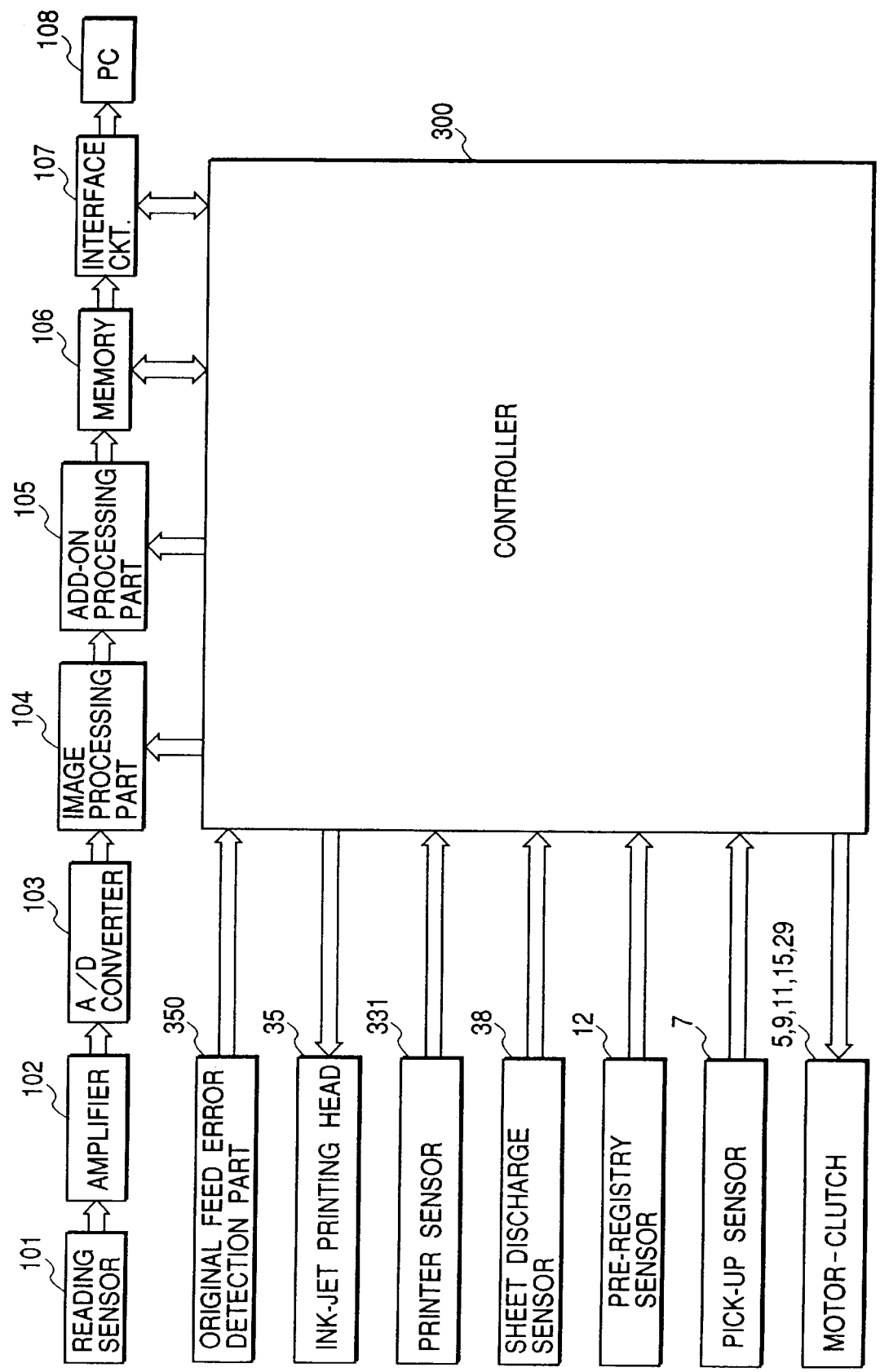
FIG. 4 is a block diagram of the control circuit of the image processing apparatus.

The originals are discharged from the feed path H and stacked on the discharge part 30. After the pick-up lever 6 detects that no more originals remain on the original table 2, and the sheet discharge sensor 38 detects that the final original has pass ed, all parts stop driving. The above processing is controlled by a controller (to be described later). This processing will be described with reference to FIG. 4. FIG. 4 is a block diagram of the control circuit of the image processing apparatus shown in FIG. 1.

Referring to FIG. 4, a reading sensor 101 for reading an image is present in each of the reading units 31 and 32. An amplifier 102 amplifies, or samples and holds the signal from the reading sensor 101, or corrects the black level of the signal.

An A/D converter 103 converts the analog output from the amplifier 102 into a digital signal. An image processing part 104 performs shading correction, gamma correction, edge emphasis, or binarization of image data from the A/D converter 103.

Processing by the image processing part 104 is not always necessary and can be partially or entirely omitted, as needed.

An add-on processing part 105 can partially change image data from the image processing part 104. The contents of the change can be determined by designation from the controller 300 side.

A memory 106 temporarily stores image ;data from the image processing part 104 by properly transferring the data by DMA (Direct Memory Access). An interface circuit 107 to an external device may be a standard interface such as a parallel or serial inte face or an interface dedicated to a special purpose. A PC 108 is connected through the interface circuit 107.

Specific examples of use of add-on processing will be listed below.
(1) Search From Image Data A character string as, e.g., bitmap data is written in image data.

This character string can be searched by processing it by OCR (Optical Character Recognition).

A bar code may be used in place of the character string.
(2) Confirmation of Matching Between Original and Image Data A character string imprinted on an original by add-on processing can be compared with the character string of image data to confirm whether the original matches the image data.

Matching can be easily confirmed using a character string below.

File name+serial number (page number)

(3) Confirmation of Date of Image data Read

When a date and time are used as a character string written by add-on processing, the date of image data read can be recorded. This can be used as an easy measure against image alteration (the date is compared with the creation date in the properties of a file).

(4) Confirmation of Machine or Business Office That Has Read Image Data

When the number of a machine or, for a distribution slip, the name of a business office that has read the image data is used for a character string written by add-on processing, the machine or business office that has created the image data can be managed.

In the conventional scheme of performing add-on processing for an original before image reading, a character string unsuitable for OCR is printed depending on imprinting performance. Even when a character string suitable for OCR is printed, it is not always stored as an image suitable for OCR if the paper sheet skews or is fed irregularly.

When image data is subjected to digital add-on processing, as in this embodiment, a font suitable for OCR can be set. In addition, the write position can be made constant. For this reason, the recognition rate of OCR or bar code decoding (when a bar code is added on) can be greatly increased as compared to the prior art.

The control operation will be described next. Image data stored in the memory 106 is sequentially sent to the PC 108 through the interface circuit 107 and stored in the PC.

The ink-jet printing head 35 is controlled by the controller 300 and, in accordance with an instruction from the controller 300, prints character, number, or image information on an original appropriately fed.

An original feed error detection part (original state detection means) 350 detects an error that has occurred in original feeding. The original feed error detection part 350 is arranged at the same position of the ink-jet printing head 35 or an upstream position with respect to the original feed direction. With this arrangement, an original error can be detected before printing, and printing on the original with an error can be prevented.

The original feed error detection part 350 has a known state detection means such as a means for detecting overlap feeding of originals, a means for detecting feed jam (due to some error in original feeding, no original is fed even after a predetermined time), or a means for detecting break or holes in an original. To detect overlap feeding, a method of detecting an air layer between overlapping paper sheets using an ultrasonic wave, a method of detecting the thickness of an original to check whether a plurality of originals are fed, or a method of detecting the original pass time for originals overlapping with a shift in the feed direction to check whether the original has a predetermined length or more can be used. To detect feed jam, for example, a method of detecting the original pass time to check whether the original has a predetermined length or more. To detect break or holes in an original, for example, a transmission sensor can be used.

The controller 300 controls a series of operations including the above-described original feeding, printing, and output of image data in accordance with the following procedures.

First, the controller 300 gives target image data designated from the keyboard connected to the controller 300, or the PC 108 to the ink-jet printing head 35 or add-on processing part 105.

In a general application, the data given to the ink-jet printing head 35 and data given to the add-on processing part 105 are set such that the image to be printed on the original is identical to the image as image data fed to the PC side, though different character sizes, character intervals, and character fonts may be used.

Identical character strings need not always be used, and images associated with each other suffice.

As the original is fed, the controller 300 parallelly or sequentially controls printing by the ink-jet printing head 35 and image data processing by the add-on processing part 105. If the original length calculated from the pass time at the above-described post-registry sensor 16 is smaller than the original length required for printing by the ink-jet printing head 35, or printing will end at a position after the original has passed through the ink-jet printing head 35, the user can be notified of the error without performing printing. This also applies to a case wherein the printing range is set beyond the longitudinal width of the original.

The original width or original length can be detected by processing the output signals from the reading sensors 101 incorporated in the reading units 31 and 32.

When the original feed error detection part 350 detects, e.g., overlap feeding or jam, the operation of the ink-jet printing head 35 may be stopped, storage in the memory may be interrupted, and the user may be notified of the error.

To notify (warn) the user of an error, for example, sound generation, light emission, or image display, or a combination thereof can be used. Warning can be generated by either the scanner or the PC.

Figure 5:
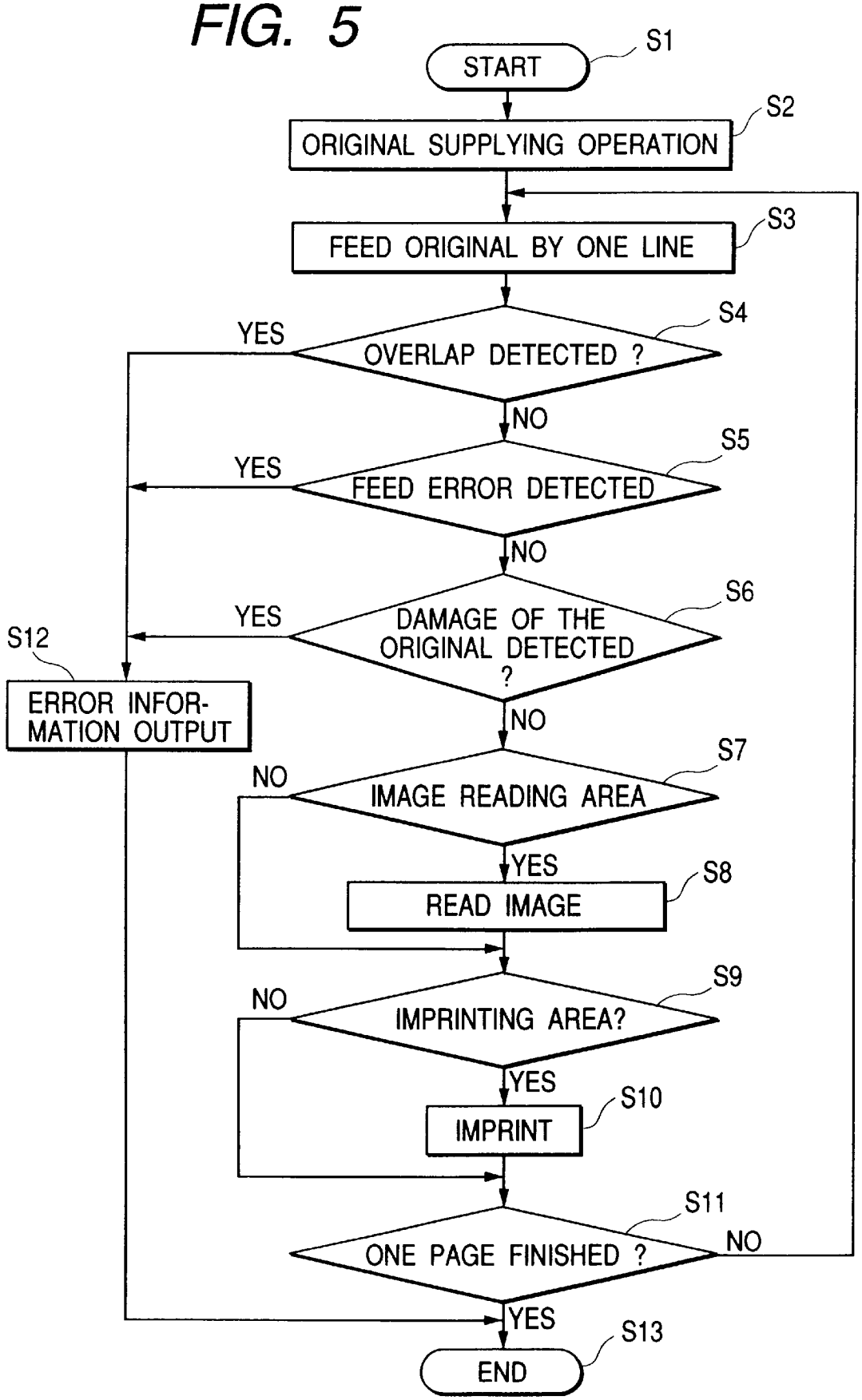
FIG. 5 is a flow chart of the operation of the present invention.

An example of the series of operations will be described with reference to the flow chart in FIG. 5.

When an instruction of one-page scanning is received, the process starts (S1), and one original is supplied (S2).

The scanner feeds the original in the feed direction (S3). As the original is fed, the original state is continuously checked, and image reading (S8) and imprinting (S10) are performed simultaneously at a predetermined timing. If overlap feeding (S4), feed error (S5), damage such as break or holes in the original (S6) is detected, the scanner stops operating and transmits error information to the PC side (S12). If position of the image to be read falls outside the range of the length of the sheet material or outside the range of the width of the sheet material (S7), the scanner stops operating. If position of the imprinting to be imprinted falls outside the range of the length of the sheet material or outside the range of the width of the sheet material (S9), the scanner stops operating. Imprinting is not performed, either. At this time, warning may be generated.

Normally, an image is read in units of lines in the main scanning direction of the reading sensor. The detection is normally performed in synchronism with this reading. However, the detection may be performed every predetermined period or at random.

The above operation is repeated until image data of one page is acquired (S11).

When image data of one page is acquired, the sheet discharge operation starts. During this operation as well, the original state may be detected while feeding the original. If an error is detected, the operation may be stopped, as described above, and error information may be sent to the PC.

With this arrangement, if an original feed error, or break or holes in an original is detected before imprinting, imprinting can be stopped. For this reason, the operation can be interrupted before printing on a paper sheet, and undesired printing on the original can be avoided.

In this operation example, the original state detection means is arranged at a portion upstream near the image formation means. However, one more state detection means may be prepared upstream of the image formation means. According to this arrangement, the original state can be more specifically detected.

As the original state detection means, all of the above-described overlap feeding detection means, feed error detection means, and original break/hole detection means need not always be prepared. A necessary detection means may be prepared in accordance with the specifications of the scanner or use environment of the user.

An operation to be performed in accordance with the detection result from the state detection means may be arbitrarily selected from stop of imprinting, warning to the user, and stop of storage in the memory.

In fact, processing by the add-on processing part 105 may be performed on image data written in the memory 106.

The interface circuit 107 and PC 108 can be integrated with the image processing apparatus of the present invention.

The above-described add-on processing may be executed by software, i.e., a so-called device driver ordinarily installed on the PC 108 side.

Figure 6:
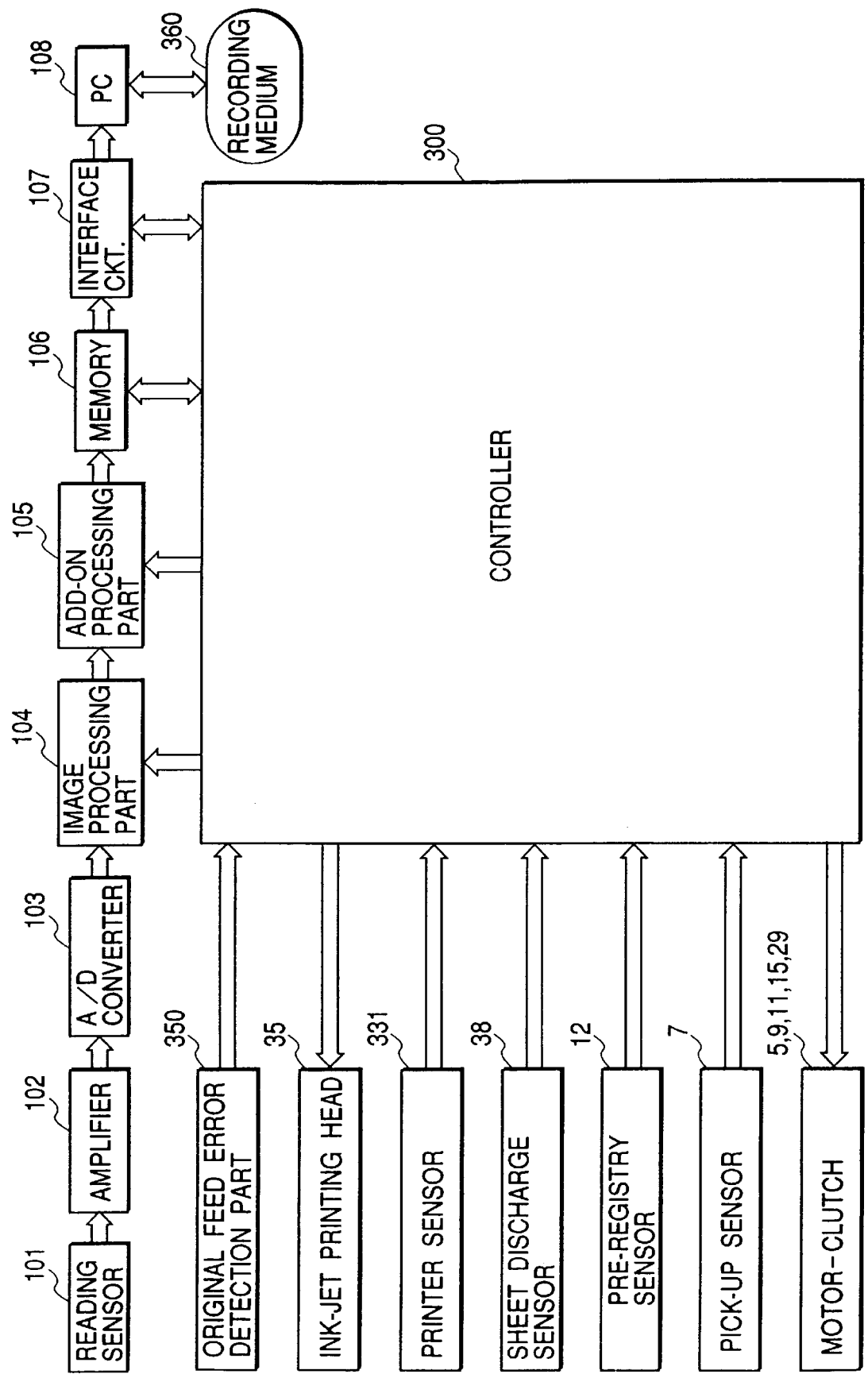
FIG. 6 is a block diagram showing another form of the control circuit of the image processing apparatus.

In this case, a recording medium 360 which records the program of the above-described series of procedures is inserted into the PC 108, and the controller 300 executes the series of procedures in accordance with the program, as shown in FIG. 6.

Hence, the recording medium 360 shown in FIG. 6 constitutes an embodiment of a recording medium which records an image processing program of the present invention. As the recording medium shown in FIG. 6, various types of recording media including a magnetic tape, magnetic disk, optical disk, and semiconductor memory device can be used. However, the recording medium is not limited to these examples, and any other arbitrary medium can be used. The sheet-through scanner of this embodiment reads image information of an original. However, the present invention can also be applied to an apparatus such as a facsimile apparatus or copying machine that has an image formation means for forming an image on a recording paper sheet as a sheet material.

Another embodiment of the present invention will be described below. As a characteristic feature of this embodiment, a PC main body is equipped with an add-on processing part. An operation example of add-on processing on the PC side will be described below.

Figure 7:
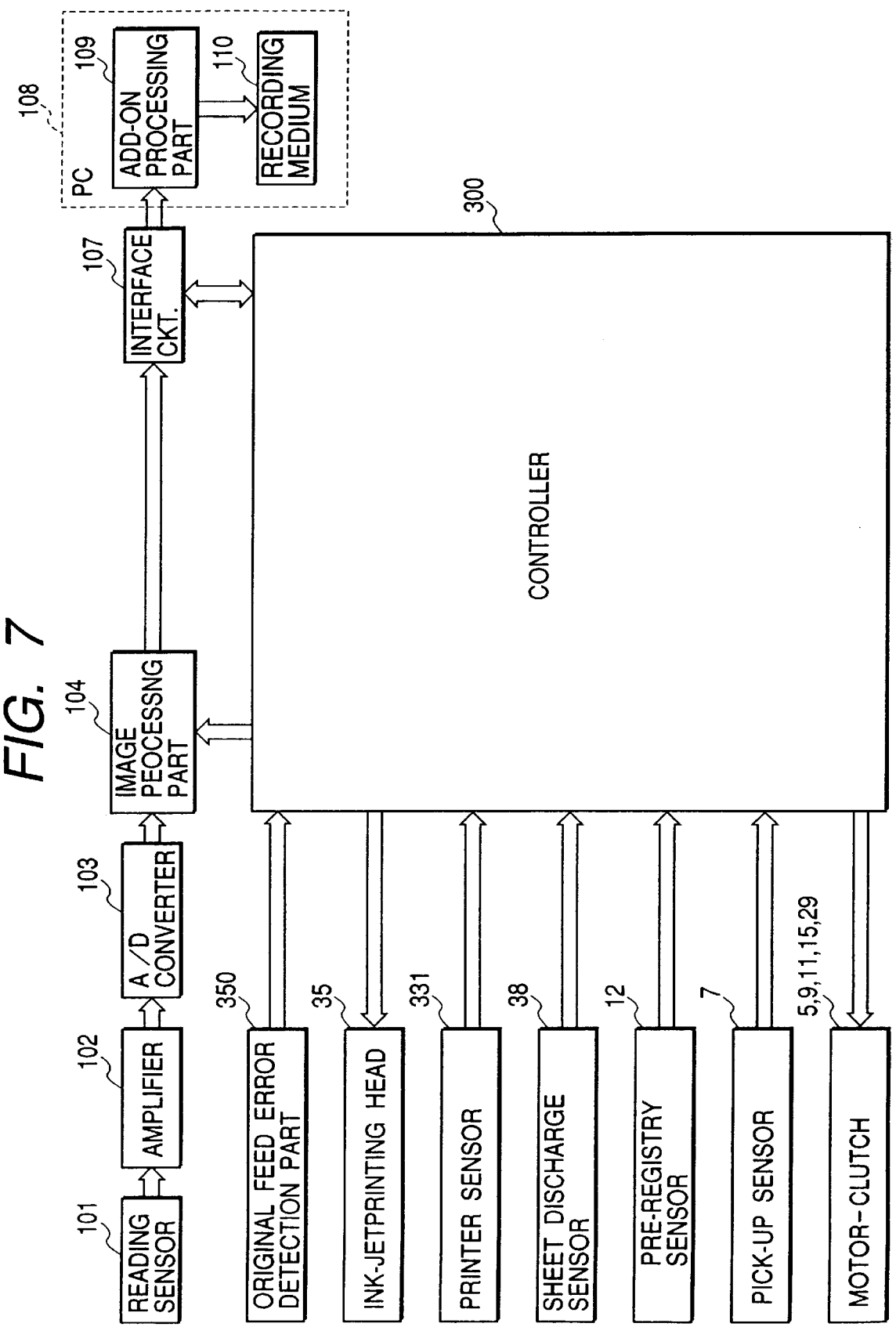
FIG. 7 is a block diagram of a control circuit according to another embodiment.

FIG. 7 is a block diagram showing the characteristic feature of this embodiment. Image data obtained from an image processing part 104 is sent to the PC main body through an interface circuit 107 and then to an add-on processing part 109 incorporated in the PC. Add-on processing is performed for the read image data, and the processed image data is stored in a recording medium 110. The main operations except those described above are the same as in the above embodiment.

On the PC side, only when data of one page is received without any error information on the scanner side, the image data transmitted from the scanner side is bitmapped, and character data, bar code data, or a file symbol is written as an add-on signal. The image may be compressed (e.g., MH, MR, MMR coding, or JPRG coding) and stored in the recording medium 110 such as an HDD, MOD, or CDR, as needed. If error information is transmitted, the processing may be ended without storing the image data.

In the above example, the image data is ,not stored in the recording medium. However, the image data may be stored in the recording medium while displaying, e.g., an error message on the CRT to call attention of the user, and the user may be offered with a choice of use/nonuse of the image data.

In this arrangement as well, if an original feed error, or break or holes in of an original is detected before imprinting, imprinting can be stopped, as in the above-described embodiment. For this reason, the operation can be interrupted before printing on a paper sheet, and undesired printing on the original can be avoided.

As is apparent from the above description, according to the present invention, the read image on the sheet material is processed on the basis of an image to be formed by the image formation means. Hence, an image processing apparatus which need not form an image before reading the image on the sheet material and can prevent ink contamination and increase the operation speed, and a recording medium which records the image processing program can be provided.

In addition, the state of the sheet material is detected upstream of the image formation means, and warning is generated or the image formation operation is stopped on the basis of the detection result. Hence, an image processing apparatus capable of performing appropriate image formation processing even when a sheet material feed error occurs, and a recording medium which records the image processing program can be provided.

What is claimed is:

1. An image processing apparatus having an image reading unit, which reads an image on a sheet material, comprising:
   an add-on unit which processes a signal so that a second image is added on a part of a first image read by said image reading unit; and
   an image formation unit which forms a third image, which is associated with the second image to be added on by said add-on unit, on a part of the sheet material.

2. An apparatus according to claim 1, wherein a side of the sheet material on which the third image is to be formed is the same as the side of the sheet material on which the first image is to be read.

3. An apparatus according to claim 1, wherein the second image is the same as the third image.

4. An apparatus according to claim 1, wherein the second image is different from the third image.

5. An apparatus according to claim 1, wherein said image reading unit is arranged upstream of said image formation unit in a feed direction of the sheet material.

6. An apparatus according to claim 1, further comprising:
   a sheet state detection unit which is arranged in a feed path of the sheet material in the same position as that of said image formation unit or a position upstream of said image formation unit in a feed direction of the sheet material, and which detects a state of the sheet material; and
   a control part which controls an image formation operation by said image formation unit in accordance with a detection result from said sheet state detection unit.

7. An apparatus according to claim 1, further comprising:
   a search unit which performs a search on the basis of the second image added on by said add-on unit.

8. An apparatus according to claim 1, wherein the third image corresponds to the second image.

9. An image processing system in which an image processing apparatus having an image reading unit which reads an image in a sheet material and an image formation unit which forms an image on the sheet material and an information processing apparatus which processes information are connected through an interface part,
   wherein said information processing apparatus is provided with an add-on processing part which adds an image on the image read by said image reading unit and transmitted to said information processing apparatus, and wherein the image to be added on is the same as the image to be formed on the sheet material by said image formation unit.

10. An image processing system in which an image processing apparatus having an image reading unit which reads a first image in a sheet material and an image formation unit which forms an image on the sheet material and an information processing apparatus which processes information are connected through an interface part, wherein said information processing apparatus is provided with an add-on processing part which processes a signal so that a second image is added on a part of the first image read by said image reading unit, and wherein said image formation unit forms a third image, which corresponds to the second image to be added on by said add-on processing part, on a part of the sheet material.

11. A recording medium in which is recorded a image processing program used in an image processing apparatus, said image processing program comprising the steps of:

feeding a sheet material;

reading an image on the fed sheet material;

forming an image on the sheet material; and adding an image, which is the same as the image to be formed on the sheet material in the forming step, on the image read in the reading step.

12. A recording medium in which is recorded an image processing program used in an image processing apparatus, said image processing program comprising the steps of:

feeding a sheet material;

reading a first image on the fed sheet material;

processing a signal so that a second image is added on a part of the first image read in the reading step; and forming a third image, which corresponds to the second image added on in the processing step, on a part of the sheet material.

13. An image processing method, comprising the steps of:

feeding a sheet material;

reading a first image on the fed sheet material;

processing a signal so that a second image is added on a part of the first image read in the reading step; and forming a third image, which is associated with the second image added on in the processing step, on a part of the sheet material.

* * * * *

UNITED STATES PATENT AND TRADEMARK OFFICE
CERTIFICATE OF CORRECTION

PATENT NO. : 6,712,464 B1  
DATED : March 30, 2004  
INVENTOR(S) : Yuji Minami et al.

Page 1 of 1

It is certified that error appears in the above-identified patent and that said Letters Patent is hereby corrected as shown below:

Column 6,  
Line 20, "pass ed," should read -- passed, --;  
Line 42, ";data" should read -- data --; and  
Line 46, "inte face" should read -- interface --.

Column 7,  
Line 34, "error-that" should read -- error that --.

Column 9,  
Line 62, ",not" should read -- not --.

Signed and Sealed this

Twenty-sixth Day of April, 2005

JON W. DUDAS  
*Director of the United States Patent and Trademark Office*

UNITED STATES PATENT AND TRADEMARK OFFICE
CERTIFICATE OF CORRECTION

PATENT NO. : 6,712,464 B1
DATED : March 30, 2004
INVENTOR(S) : Yuji Minami et al.

It is certified that error appears in the above-identified patent and that said Letters Patent is hereby corrected as shown below:

<u>Title page,</u>
Item [73], Assignee, after "Canon Denshi Kabushiki Kaisha,", "Tokyo (JP)" should read -- Saitama-ken (JP) --.

Signed and Sealed this

Twentieth Day of September, 2005

JON W. DUDAS
*Director of the United States Patent and Trademark Office*